(12) United States Patent
Matsuyama et al.

(10) Patent No.: US 11,261,794 B2
(45) Date of Patent: Mar. 1, 2022

(54) ACOUSTIC DEVICE AND GAS TURBINE

(71) Applicant: Mitsubishi Hitachi Power Systems, Ltd., Kanagawa (JP)

(72) Inventors: Keisuke Matsuyama, Tokyo (JP);
Shinji Akamatsu, Yokohama (JP);
Taiki Kinoshita, Yokohama (JP);
Kenta Taniguchi, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 853 days.

(21) Appl. No.: 16/080,561

(22) PCT Filed: Mar. 2, 2017

(86) PCT No.: PCT/JP2017/008273
§ 371 (c)(1),
(2) Date: Aug. 28, 2018

(87) PCT Pub. No.: WO2017/150664
PCT Pub. Date: Sep. 8, 2017

(65) Prior Publication Data
US 2021/0189966 A1 Jun. 24, 2021

(30) Foreign Application Priority Data

Mar. 3, 2016 (JP) .............................. JP2016-041543

(51) Int. Cl.
*F02C 7/24* (2006.01)
*F23R 3/28* (2006.01)

(52) U.S. Cl.
CPC ................ *F02C 7/24* (2013.01); *F23R 3/286* (2013.01); *F05D 2240/35* (2013.01);
(Continued)

(58) Field of Classification Search
CPC ........ F23R 3/00014; F23R 3/002; F23R 3/12; F05D 2250/11; F05D 2250/711; F05D 2250/712; F05D 2260/96
See application file for complete search history.

(56) References Cited

U.S. PATENT DOCUMENTS 4,259,842 A * 4/1981 Koshoffer ................. F23R 3/08
60/757
8,464,536 B2 * 6/2013 Bottcher ................... F23R 3/00
60/725
(Continued)

FOREIGN PATENT DOCUMENTS

CN 101625120 1/2010
CN 102971510 3/2013
(Continued)

OTHER PUBLICATIONS

International Search Report dated May 16, 2017 in International Application No. PCT/JP2017/008273, with English translation.
(Continued)

*Primary Examiner* — Todd E Manahan
*Assistant Examiner* — Thuyhang N Nguyen
(74) *Attorney, Agent, or Firm* — Wenderoth, Lind & Ponack, L.L.P.

(57) ABSTRACT

An acoustic device includes: a perforated plate that has a plurality of holes penetrating in a plate thickness direction of the perforated plate and in which a main flow is to flow on a first side of the perforated plate in the plate thickness direction; and a housing that is on a second side of the perforated plate in the plate thickness direction and partitions a space between the housing and the perforated plate, wherein a part of each of the plurality of holes on the first (Continued)

side in the thickness direction is inclined to at least one of the first side and a second side of a flow direction of the main flow.

8 Claims, 10 Drawing Sheets

(52) U.S. Cl.
CPC .... *F05D 2250/11* (2013.01); *F05D 2250/711* (2013.01); *F05D 2250/712* (2013.01); *F05D 2260/231* (2013.01); *F05D 2260/96* (2013.01); *F05D 2300/6111* (2013.01); *F23R 2900/00014* (2013.01)

(56) References Cited

U.S. PATENT DOCUMENTS

| | | | | |
|---|---|---|---|---|
| 9,376,960 | B2* | 6/2016 | Slabaugh | F28F 13/12 |
| 9,546,558 | B2* | 1/2017 | Lee | F23R 3/06 |
| 10,233,775 | B2* | 3/2019 | Bunker | F01D 25/12 |
| 10,253,984 | B2* | 4/2019 | Pearson | F23R 3/002 |
| 10,378,775 | B2* | 8/2019 | Patel | F23R 3/60 |
| 10,422,235 | B2* | 9/2019 | Bunker | F23R 3/005 |
| 10,451,278 | B2* | 10/2019 | Pidcock | F23R 3/002 |
| 2003/0141144 | A1 | 7/2003 | Wilson | |
| 2005/0097890 | A1 | 5/2005 | Ikeda et al. | |
| 2008/0087019 | A1 | 4/2008 | Macquisten et al. | |
| 2009/0094985 | A1 | 4/2009 | Johnson et al. | |
| 2010/0005804 | A1 | 1/2010 | Chen et al. | |
| 2010/0206664 | A1 | 8/2010 | Bagnall | |
| 2012/0198854 | A1 | 8/2012 | Schilp et al. | |
| 2013/0098063 | A1 | 4/2013 | Mizukami et al. | |
| 2013/0160453 | A1 | 6/2013 | Kimura et al. | |
| 2014/0345282 | A1* | 11/2014 | Pfadler | F23R 3/16 60/725 |
| 2015/0096829 | A1 | 4/2015 | Bothien et al. | |
| 2015/0113992 | A1 | 4/2015 | Tonon et al. | |
| 2017/0356653 | A1* | 12/2017 | Bagchi | F23R 3/007 |

FOREIGN PATENT DOCUMENTS

| | | |
|---|---|---|
| CN | 104040260 | 9/2014 |
| CN | 104566455 | 4/2015 |
| EP | 2 623 744 | 8/2013 |
| EP | 2 784 394 | 10/2014 |
| EP | 2 860 449 | 4/2015 |
| JP | 2006-132505 | 5/2006 |
| JP | 4879354 | 2/2012 |
| JP | 2012-77660 | 4/2012 |
| JP | 2012-159259 | 8/2012 |
| JP | 2013-140248 | 7/2013 |
| JP | 2015-75116 | 4/2015 |
| JP | 2015-86877 | 5/2015 |
| WO | 2013/077394 | 5/2013 |

OTHER PUBLICATIONS

Written Opinion of the International Searching Authority dated May 16, 2017 in International Application No. PCT/JP2017/008273, with English translation.

* cited by examiner

MAIN FLOW

ACOUSTIC DEVICE AND GAS TURBINE

CROSS-REFERENCE TO RELATED APPLICATION

This application claims priority to Japanese Patent Application No. 2016-041543 filed on Mar. 3, 2016, the content of which is incorporated herein by reference.

TECHNICAL FIELD

The present invention relates to an acoustic device and a gas turbine.

BACKGROUND TECHNOLOGY

For example, in a combustor used in a gas turbine, it is known that noise including combustion noise generated during combustion of a fuel, rubbing noise generated between a fluid and another member, and the like, is generated. Such noise (acoustic vibration) is one of the causes of resonance with other members in a specific frequency band. If resonance has developed, there is also the possibility of generating a self-excited vibration in the entire device. Further, in the case of a gas turbine, depending on the installation environment, an allowable noise level may be extremely low, and thus a demand for a reduction measure of the noise as described above is increasing. As a technique for reducing an acoustic vibration of a combustor, a device called an acoustic damper described in Patent Document 1 below Japanese Unexamined Patent Publication No. 2015-86877 is known. The acoustic damper includes a cavity forming a Helmholtz resonator, and a neck portion having one end communicating with the cavity and the other end communicating with an inside of a chamber of a gas turbine. In particular, the neck extends in a direction orthogonal to a flow of an abrading flow flowing through the inside of the chamber.

SUMMARY OF THE INVENTION

Problems to be Solved by the Invention

Here, when a sound wave is considered as particles (acoustic particles), the kinetic energy of the acoustic particles flowing through the neck portion is determined by the differential pressure between the upstream side and the downstream side of the neck portion. However, when the flow direction of the rubbing flow and the traveling direction of the sound wave in the neck portion are perpendicular to each other as described above, it is impossible to sufficiently provide the kinetic energy to the acoustic particles, so that it is not possible to sufficiently guide the sound waves toward the cavity portion. Accordingly, there is a possibility that the effect of reducing the sound (noise) becomes limited.

The present invention is provided to solve the above problem and is objected to provide an acoustic device which is improved in noise reduction effect.

Means for Solving the Problem

According to a first aspect of the present invention, an acoustic device comprises: a perforated plate that has a plurality of holes penetrating in a plate thickness direction of the perforated plate and in which a main flow flows on one side of the perforated plate in the plate thickness direction, and a housing that is provided on the other side of the perforated plate in the plate thickness direction and partitions a space between the housing and the perforated plate, wherein part of the holes on the one side in the thickness direction is inclined to at least one of the one side and the other side of a flow direction of the main flow.

According to this configuration, it is possible to cross the flow direction of the main flow and an extension direction in which the hole extends (i.e., the direction in which the particles of the sound wave travel) without crossing each other at right angles. Here, the magnitude of the kinetic energy imparted to the particles of sound waves flowing through the hole depends on the differential pressure on both sides of the perforated plate. The magnitude of this differential pressure is mainly determined by the dynamic pressure of the acoustic particles forming the main flow. Furthermore, the magnitude of the dynamic pressure is governed by the magnitude of the inner product of the speed vector of the main flow and the velocity vector of the acoustic particles in the hole. As described above, by crossing the direction of the main flow and the extension direction of the hole without crossing each other at right angles, it is possible to set the inner product of the speed vector of the main flow and the speed vector of the acoustic particles in the hole to be larger than 0. Thus, it is possible to increase the kinetic energy of sound waves flowing through the hole. In other words, it is possible to sufficiently take in the sound wave toward the space inside the housing.

According to a second aspect of the present invention, in the acoustic device according to the first aspect, the perforated plate has an inner plate facing toward the one side in the plate thickness direction and an outer plate provided in a state of being stacked on the other side of the inner side plate in the plate thickness direction, and wherein each of the holes includes: an inner hole portion that penetrates the inner plate in the thickness direction and is inclined to at least one of the one side and the other side in the flow direction of the main flow; and an outer hole portion that communicates with the inner hole, penetrates the outer plate in the plate thickness direction, and extending in the plate thickness direction.

In this configuration, five perforated plate is formed of the outer plate and the inner plate, and only the inner hole portion formed in the inner plate is inclined. Thus, it is possible to sufficiently take in the sound wave toward the space inside the housing. In addition, since only the inner hole portion is inclined, it is possible to reduce the degree of difficulty and cost required for the manufacturing of the perforated plate as compared with the case where the inner hole portion and the outer hole portion are inclined together.

According to a third aspect of the present invention, in the acoustic device according to the second aspect, an opening size of the inner hole portion is set larger than an opening size of the outer hole portion.

According to this configuration, since the opening size of the inner hole portion is larger than the opening size of the outer hole portion, the outer peripheral edge of the outer hole portion is exposed in the outer hole portion. In other words, a step is formed in the hole by the outer peripheral edge of the outer hole portion. Since this step becomes the resistance to the sound wave which has reached an inside of the hole, it is possible to further sufficiently attenuate the sound wave. Further, since it is not necessary to make the opening size of the inner hole portion and the opening size of the outer hole portion coincide with each other, it is possible to manufacture the perforated plate more easily and at a lower cost.

According to a fourth aspect of the present invention, in the acoustic device according to the second aspect, an opening size of the inner hole portion is set smaller than an opening size of the outer hole portion.

According to this configuration, since the opening size of the inner hole portion is smaller than the opening size of the outer hole portion, the outer peripheral edge of the inner hole portion is exposed in the outer hole portion. In other words, a step is formed in the hole by the outer peripheral edge of the inner hole portion. Since this step becomes the resistance to the sound wave which has reached the inside of the hole, it is possible to further sufficiently attenuate the sound wave. Further, since it is not necessary to make the opening size of the inner hole portion and the opening size of the outer hole portion coincide with each other, it is possible to manufacture the perforated plate more easily and at a lower cost.

According to a fifth aspect of the present invention, in the acoustic device according to any one of the first to fourth aspects, a convexo-concave shape is formed on an upstream side of each of the holes on a surface of the perforated plate which is in contact with the main flow.

According to this configuration, the flow direction of the main flow flowing from the upstream side of the hole is changed by the convexo-concave shape formed on the upstream side of the hole. Thus, it is possible to cross the extension direction of the hole and the flow direction of the main flow without crossing each other at right angles. Thus, it is possible to sufficiently take in the sound wave toward the space inside the housing.

According to a sixth aspect of the present invention, the above-described acoustic device includes: a perforated plate that has a plurality of holes passing through a plate thickness direction of the perforated plate and in which a main flow flows on one side of the perforated plate in the plate thickness direction; and a housing that is provided on the other side of the perforated plate in the plate thickness direction and partitions a space between the housing and the perforated plate, wherein a convexo-concave shape is formed on an upstream side of each of the holes on a surface of the perforated plate which is in contact with the main flow.

According to this configuration, the flow direction of the main flow flowing from the upstream side of the hole is changed by the convexo-concave shape formed on the upstream side of the hole. Thus, it is possible to cross the extension direction of the hole and the flow direction of the main flow without crossing each other at right angles. Thus, it is possible to sufficiently take in the sound wave toward the space inside the housing.

According to a seventh aspect of the present invention, a gas turbine includes: a compressor configured to generate high pressure air; a combustor configured to generate a combustion gas by mixing a fuel with the high pressure air and burning the mixture; the acoustic device according to any one of the first to sixth aspects, which is mounted on the combustor, and a turbine configured to be driven by the combustion gas.

According to this configuration, it is possible to obtain a gas turbine in which noise is sufficiently reduced.

Effect of Invention

According to the present invention, it is possible to provide an acoustic device and a gas turbine which enhance noise reduction effect.

MODE FOR CARRYING OUT THE INVENTION

First Embodiment

Figure 1:
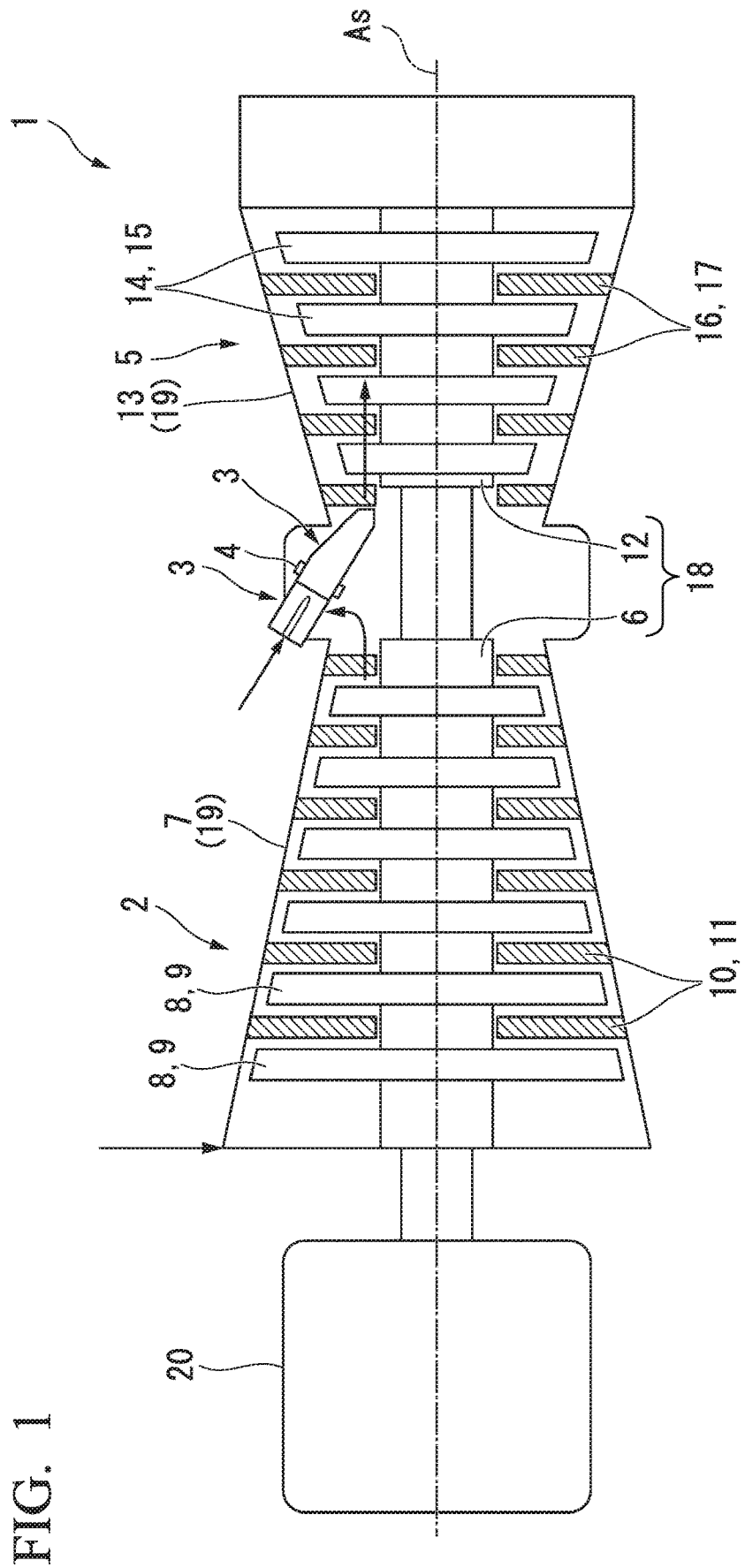
FIG. 1 is a schematic diagram showing a configuration of a gas turbine according to a first embodiment of the present invention.

A first embodiment of the present invention will be described with reference to FIGS. 1 to 5. As shown in FIG. 1, an acoustic device 4 according to the present embodiment is attached to a combustor 3 in a gas turbine 1. The gas turbine 1 includes a compressor 2, the combustor 3, and a turbine 5.

The compressor 2 has a compressor rotor 6 extending along an axis As and a compressor casing 7 covering the compressor rotor 6 from an outer peripheral side thereof. The compressor rotor 6 has a columnar shape centered on the axis As, and a compressor blade 8 is mounted on an outer peripheral surface of the compressor rotor 6. A plurality of the compressor blades 8 are arranged at intervals in a circumferential direction with respect to the axis As to form one compressor blade stage 9. On the compressor rotor 6, such compressor blade stage 9 is provided in a plurality of rows at intervals in the direction of the axis As.

On an inner peripheral side of the compressor casing 7, a plurality of rows of compressor vane stages 11 arranged alternately in the direction of the axis As with respect to the compressor blade 8 are provided. The compressor vane stage 11, as similar to the compressor blade stage 9, has a plurality of compressor vanes 10 arranged at intervals in the circumferential direction of the axis As.

The combustor 3 generates a high temperature and high pressure combustion gas by mixing the fuel with the high pressure air generated by the compressor 2 and by burning the mixture. This combustion gas is sent to a turbine 5, which will be described later, to drive the turbine 5.

The turbine 5 has a turbine rotor 12 extending along the axis As, and a turbine casing 13 covering the turbine rotor 12 from an outer peripheral side thereof. The turbine rotor 12 has a columnar shape centered on the axis As, and a turbine blade 14 is mounted on an outer peripheral surface of the turbine rotor 12. A plurality of turbine blades 14 are arranged at intervals in the circumferential direction with respect to the axis As, thereby forming one turbine blade stage 15. On the turbine rotor 12, such turbine blade stage 15 is provided in a plurality of rows at intervals in the direction of the axis As.

On an inner peripheral side of the turbine casing 13, a plurality of rows of the turbine stationary blade stages 17 arranged alternately in the direction of the axis As with respect to the turbine blade 14 described above are provided. The turbine vane stage 17 has a plurality of turbine vanes 16 arranged at intervals in the circumferential direction of the axis As.

The compressor rotor 6 and the turbine rotor 12 are positioned coaxially (positioned on axis As) and are connected to each other to form a gas turbine rotor 18. A generator 20, for example, is connected to a shaft end of the gas turbine rotor 18. Further, the compressor casing 7 and the turbine casing 13 are connected to each other to form a gas turbine casing 19.

In the gas turbine 1 configured as described above, as the compressor rotor 6 rotates, the compressor 2 generates high pressure air. Further, the high-pressure air is led to the combustor 3 and combusted together with the fuel, so that a high-temperature and high-pressure combustion gas is generated. Subsequently, the combustion gas is directed to the turbine 5 and sequentially collides with the turbine blade 14 and the turbine vane 16, whereby kinetic energy is given to the turbine rotor 12 (the gas turbine rotor 18). Due to this kinetic energy, the gas turbine rotor 18 rotates about the axis As. The rotation of the gas turbine rotor 18 is taken out by a generator 20 connected to the shaft end, and is used for power generation or the like.

Figure 2:
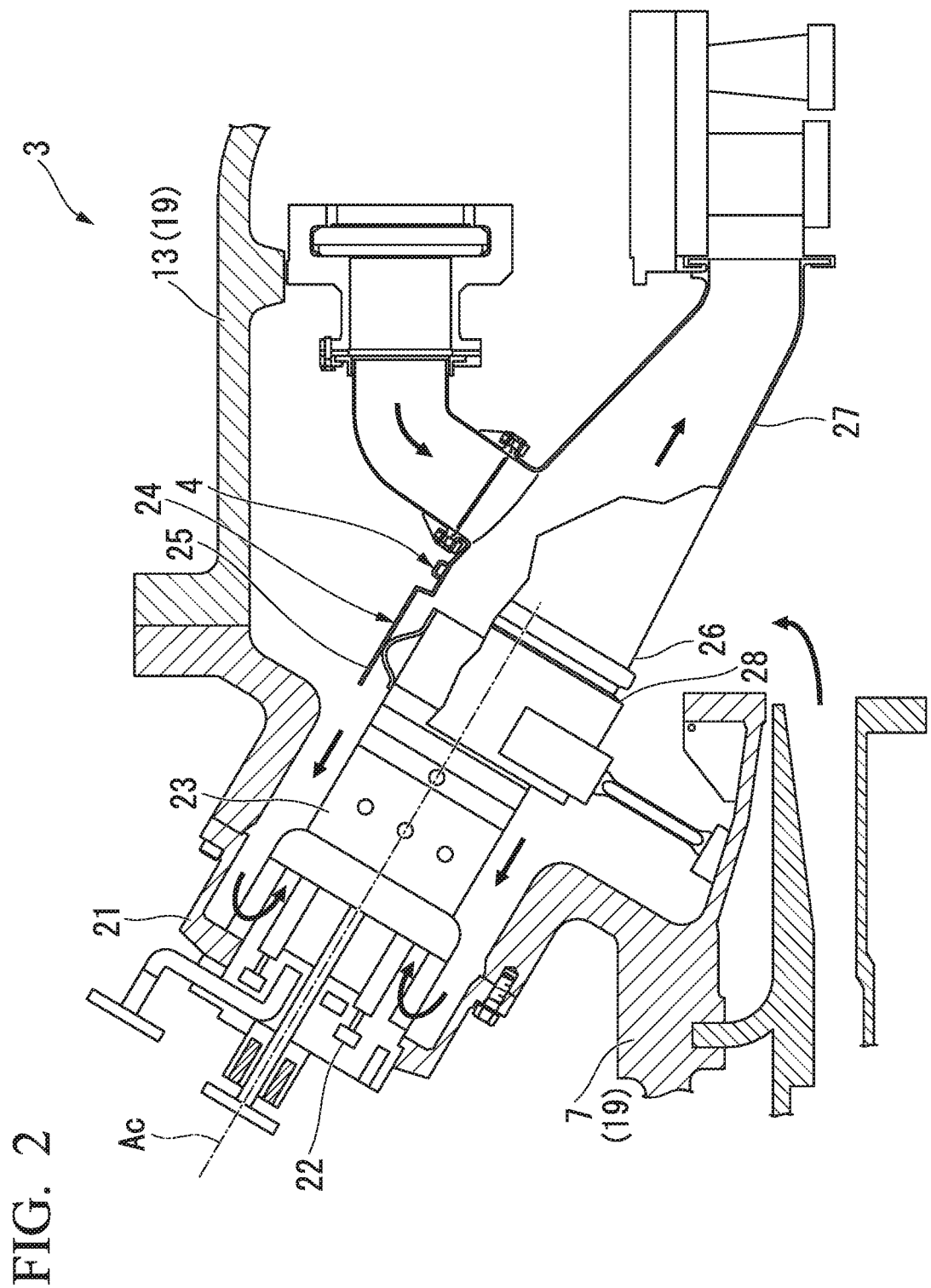
FIG. 2 is a schematic diagram showing a configuration of a combustor according to the first embodiment of the present invention.
Figure 3:
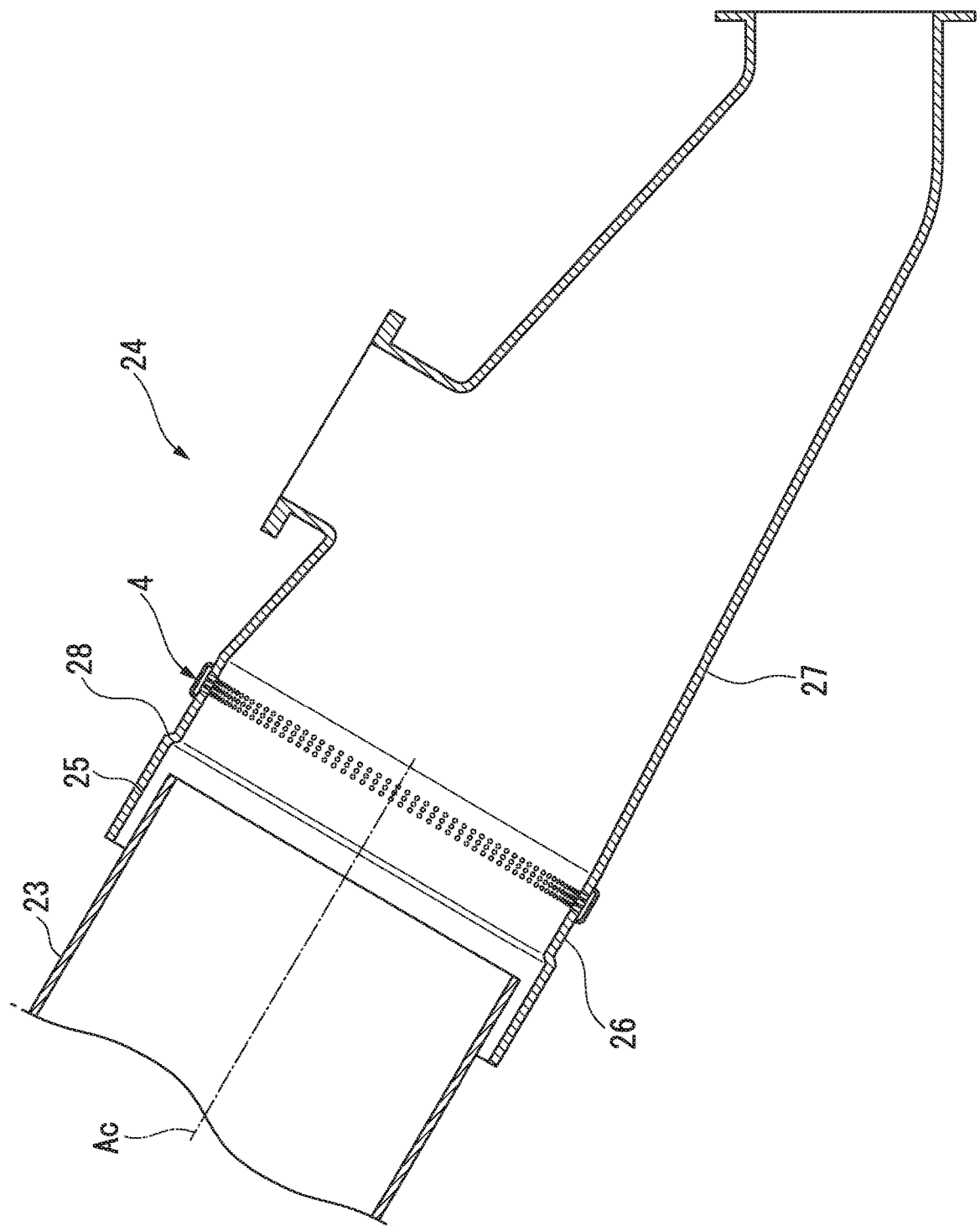
FIG. 3 is a diagram showing a configuration of an acoustic device according to the first embodiment of the present invention.

Next, with reference to FIG. 2 and FIG. 3, a description will be given of a configuration of the combustor 3. The combustor 3 has a nozzle 22 supported by an outer cylinder 21 and supplying fuel, an inner cylinder 23 inside of which the fuel supplied from the nozzle 22 and the compressed air supplied from the compressor 2 are supplied, and a transition piece 24 connected to a downstream side of the inner cylinder 23.

The nozzle 22 supplies a premixed gas mixed with fuel and compressed air to the inside of the inner cylinder 23. The inner cylinder 23 has a cylindrical shape centered on a combustor axis Ac. The combustor axis Ac extends in a direction intersecting with the axis As described above. A transition piece 24 is connected to an end portion of the downstream side of the inner cylinder 23. The fuel supplied from the nozzle 22 is mixed with compressed air inside the inner cylinder 23, and then combusted to generate a combustion gas. The combustion gas is supplied to the turbine 5 via the transition piece 24.

In addition, expressions, such as upstream, downstream, upstream side, downstream side, and the like, used in this embodiment refer to the flow of combustion gas flowing inside the inner cylinder 23 and inside the transition piece 24. In other words, the side where the nozzle 22 is provided with respect to the transition piece 24 is referred to as an upstream side, and the side where the transition piece 24 is provided with respect to the nozzle 22 is referred to as a downstream side. In addition, the flow direction of the combustion gas refers to a direction along the direction of the combustor axis Ac. Further, the flow of the combustion gas flowing through the inside of the inner cylinder 23 and the inside of the transition piece 24 is sometimes referred to as a "main flow".

The transition piece 24 includes an inlet ring 25, a central ring 26, and an outlet ring 27. The inlet ring 25 is a substantially cylindrical member that is connected to a downstream end of the inner cylinder 23. An inner diameter and an outer diameter of the inlet ring 25 are substantially constant along the combustor axis Ac. The downstream end of the inlet ring 25 is integrally connected to a central ring 26, which will be described later, via a transition-piece step portion 28. In addition, the transition-piece step portion 28 is formed by rapidly reducing the size of the inlet ring 25 in a radial direction. The downstream end of the inner cylinder 23 is inserted inside the inlet ring 25 in the direction of the combustor axis Ac up to a position on the upstream side of the transition-piece step portion 28.

The central ring 26 is a member which is connected at the downstream side of the transition-piece step portion 28 and has a substantially cylindrical shape centered on the combustor axis Ac. The size of the central ring 26 in the radial direction is set to be smaller than the size of the inlet ring 25 described above in the radial direction. As with the inlet ring 25, the central ring 26 is also substantially constant in size in the radial direction.

Figure 4:
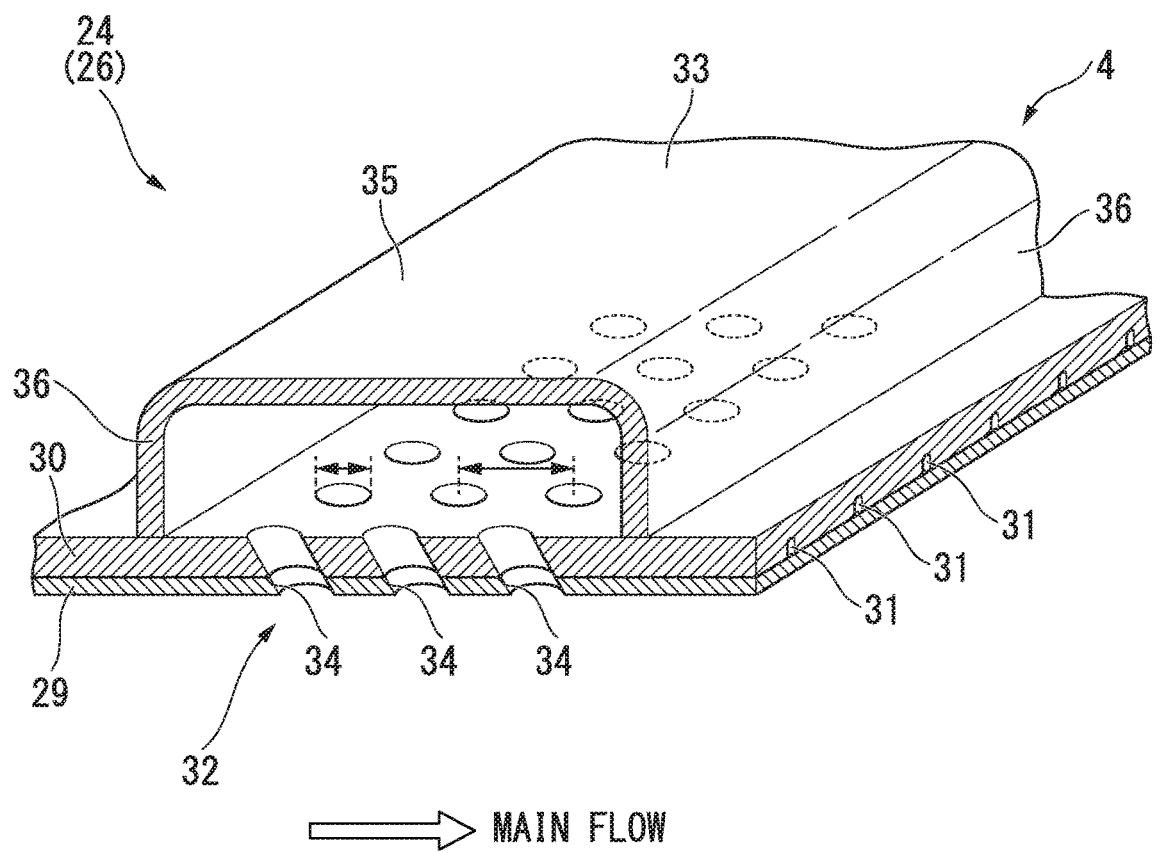
FIG. 4 is a diagram showing a configuration of the acoustic device according to the first embodiment of the present invention.

Further, as shown in FIG. 4, the transition piece 24 (the inlet ring 25, the center ring 26, and the outlet ring 27) is formed by two plates stacked in the radial direction of the combustor axis Ac. More specifically, the transition piece 24 has an inner plate 29 which faces toward one side (inner side in the radial direction) of a plate thickness direction, and an outer plate 30 which faces toward the other side (outer side in the radial direction) of the plate thickness direction. The inner plate 29 and the outer plate 30 are stacked in the thickness direction.

A cooling flow path called an MT fin is formed on the inner side in the radial direction of the outer plate 30 as an example. The cooling flow path is formed of a plurality of recessed grooves 31 which are recessed radially outward from the radially inner surface of the outer plate 30. The plurality of recessed grooves 31 are formed in a plurality of rows at intervals in the circumferential direction of the combustor axis Ac. The compressed air flowing through the gas turbine casing 19 flows through the cooling flow path. Thus, it is possible to protect the transition piece 24 itself from the radiant heat of the combustion gas and the like.

Further, among the parts of the transition piece 24 (the inlet ring 25, the central ring 26, and the outlet ring 27), an acoustic device 4 is mounted on the central ring 26 for reducing the combustion noise generated in the combustor 3, the friction noise generated between the combustion gas and the transition piece 24, and the like. The acoustic device 4 includes a perforated region 32 formed on part of the central ring 26 described above, and a housing 33 covering the perforated region 32 and defining a space.

The perforated region 32 is a region that forms part of the central ring 26 in the direction of the combustor axis Ac. In this perforated region 32, a plurality of holes 34 penetrating in the direction of the plate thickness of the central ring 26 are formed. More specifically, these holes 34 are annularly arranged at equal intervals in the circumferential direction along an outer peripheral surface of the central ring 26. A region in which the holes 34 in the central ring 26 are formed is defined as the above-described perforated region 32 (perforated plate). The main flow of combustion gas flows in a radially inner region of the perforated region 32. This main flow flows along a surface of the perforated region 32. In other words, the flow direction of the main flow is parallel to the radially inner side surface of the perforated region 32.

Further, the perforated region 32 is covered by the housing 33 from the outer peripheral side. More specifically, as shown in FIG. 4, the housing 33 includes a main plate 35 spaced apart in the radial direction of the combustor axis Ac with respect to the outer peripheral surface of the central ring 26 and extending along the outer peripheral surface of the central ring 26, and a pair of lateral plates 36 connecting the main plate 35 and the outer peripheral surface of the central ring 26 in five radial direction. Also, the housing 33 extends along the outer peripheral surface of the central ring 26 and in the circumferential direction of the combustor axis Ac. In other words, the housing 33 defines an annular space between the housing 33 and the perforated region 32.

Figure 5:
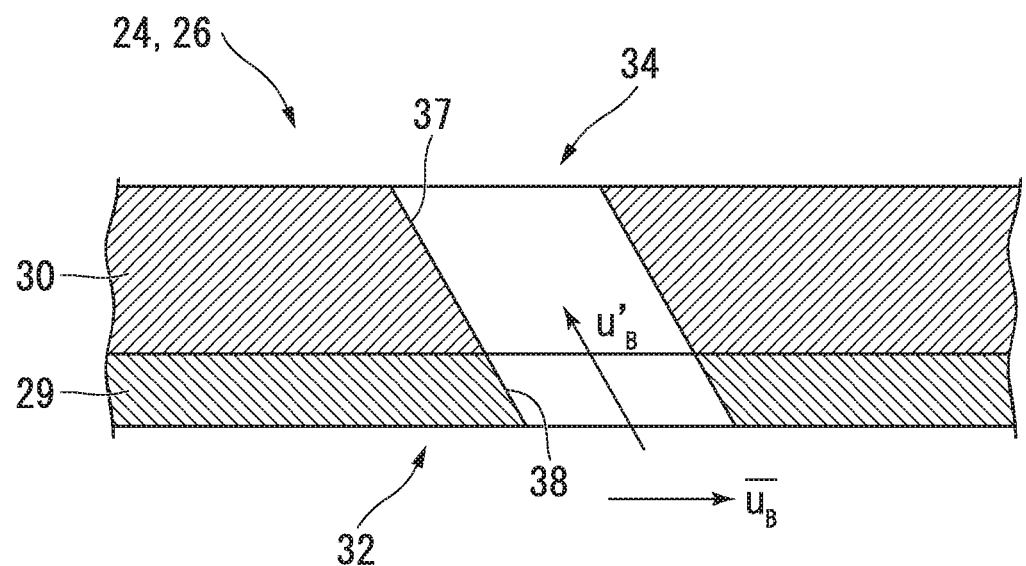
FIG. 5 is an enlarged cross-sectional view of an essential portion of the acoustic device according to the first embodiment of the present invention.

As shown in FIG. 4 and FIG. 5, an extension direction in which the hole 34 extends is inclined with respect to the flow direction of the main flow. More specifically, the hole 34 extends from the one side (upstream side) in the flow direction of the main flow toward the other side (downstream side) while directed from the outside to the inside in the radial direction of the perforated region 32. Further, each of the holes 34 has a circular cross section when viewed from the plate thickness direction.

Further, as shown in FIG. 5, each of the holes 34 is formed by communicating an outer hole portion 37 formed in the outer plate 30 with an inner hole portion 38 formed in the inner plate 29.

In this embodiment, an opening size of the outer hole 37 and an opening size of the inner hole 38 are set to be equal to each other. In other words, a step or the like is not formed between the outer hole portion 37 and the inner hole portion 38. In addition, the opening size refers to a diameter or a radius of the hole 34 having a circular cross section.

Next, operations of the gas turbine 1 and the acoustic device 4 according to the present embodiment will be described.

As described above, in operation of the gas turbine 1, the gas turbine rotor 18 is first driven to rotate by air external drive source, so that an external air is taken into the compressor 2. The air taken into the compressor 2 is sequentially compressed in the compressor 2 while flowing through the compressor blades 8 and the compressor vanes 10 in accordance with the driving of the compressor 1 and becomes high pressure air.

This high pressure air is introduced into the combustor 3 through the gas turbine casing 19. In the combustor 3, the high pressure air and the fuel are mixed to form a premixed gas. By igniting the premixed gas, a combustion gas at high temperature and high pressure is generated. Subsequently, the combustion gas is guided into the turbine 5 to drive the turbine 5 to rotate. By repeating continuously such a cycle, the gas turbine 1 is operated.

In this case, in the combustor 3, a combustion noise caused by combustion of the premixed gas, a rubbing sound accompanied by a flowing of the combustion gas (main flow), and the like are generated. Such noise (acoustic vibration) is one of the causes of resonance with other members in a specific frequency band. If resonance has developed, there is also the possibility of generating a self-excited vibration in the entire device. Further, depending on an environment in which the gas turbine 1 is installed, an allowable noise level may be extremely low.

Therefore, in the gas turbine 1 according to the present embodiment, the above-described acoustic device 4 is mounted for the purpose of reducing noise. The acoustic device 4 attenuates the noise (sound wave) by taking in noise (sound wave) in the housing 33 which is mounted on the perforated region 32 of the transition piece 24 (central ring 26). In other words, in order to sufficiently exhibit the effect of the acoustic device 4, it is desirable that more sound waves be captured through the holes 34.

In the acoustic device 4 according to the present embodiment, as described above, since the extension direction of the hole 34 is inclined with respect to the direction of the main flow that flows through the inside of the transition piece 24, a sufficient sound wave can be guided into the hole 34. Hereinafter, the reason for this will be described based on the case where sound waves are treated as acoustic particles.

First, assuming that a velocity vector of the main flow is u, a motion equation (Euler's equation) represented by the following equation (1) is established for the behavior of the main flow.

[Equation 1]

$$\frac{\partial u}{\partial t} + (u \cdot \nabla)u = -\frac{1}{\rho}P \qquad (1)$$

In addition, $\rho$ is a density of a fluid forming the main flow, and P is the pressure in a main flow region.

Subsequently, by applying the formula of the triple product of vectors to the above equation (1), the following equation (2) is derived.

[Equation 2]

$$\frac{\partial u}{\partial t} + \omega \times u = -\frac{1}{2}\nabla u^2 - \frac{1}{\rho}\nabla P \qquad (2)$$

Where $\omega$ is the vorticity.

Further, by performing spatial integration with respect to Equation (2), the following Equation (3) is derived.

[Equation 3]

$$\int_V \frac{\partial u}{\partial t}dV + \int_V (\omega \times u)dV = -\frac{1}{2}\int_S (u_A^2 - u_B^2)dS - \frac{1}{\rho}\int_S (P_A - P_B)dS \qquad (3)$$

In addition, V is a volume of the hole 34, and S is a cross-sectional area of the hole 34. Also, $u_A$ is a velocity vector of the acoustic particles in the housing 33, and $u_B$ is a velocity vector of the particles on the main flow side. Similarly, $P_A$ is a pressure in housing 33, and $P_B$ is a pressure in the main flow side.

Here, since stagnation occurs on the main flow side of the hole 34, only the velocity of the acoustic particles may be mainly considered in the liquation (3). Also, the particle velocity in the space in the housing 33 can be ignored. Thus, the following Equation (4) is derived based on the above Equation (3).

[Equation 4]

$$\int_S (P_A - P_B) dS = -\rho \int_V \frac{\partial u}{\partial t} dV + \rho \int_V (u \times \omega) dV + \frac{\rho}{2} \int_S u_B^2 dS \quad (4)$$

Here, the left side of Equation (4) is a term representing a differential pressure between the main flow side and the housing 33 side. This differential pressure is a force applied to the acoustic particles passing through the hole 34. The first term on the right side becomes 0 when viewed on a time average. Accordingly, according to liquation (4), it is understood that the force applied to the acoustic particles in the hole 34 (i.e., the acoustic energy on the main flow side) is expressed by a vortex degree indicated by the second term of the right side and a dynamic pressure based on the particle velocity indicated by the third term of the right side. That is, if these values can be increased, more acoustic energy can be absorbed by the acoustic device 4.

Here, in the acoustic device 4 according to the present embodiment, since it is not intended to reduce noise due to generation of a vortex, attention is paid only to the effect of the dynamic pressure. At this time, the velocity vector uB of the acoustic particles on the main flow side can be described as shown in the following Equation (5).

[Equation 5]

$$u_B = \overline{u_B} + u_B' \quad (5)$$

In addition, $u_B$ (with overbar) represents the average flow rate of the main flow, and $u_B'$ represents the variation of the velocity of the acoustic particles passing through the hole 34.

From Equation (5), the third term (a term representing an effect due to dynamic pressure) on the light side of Equation (4) described above can be described as in the following Equation (6).

[Equation 6]

$$\frac{\rho}{2} \int_S u_B^2 dS = \frac{\rho}{2} \int (\overline{u_B}^2 + (u_B')^2 + 2u_B \cdot u_B') dS \quad (6)$$

Here, since the first term of the right side is the flow velocity component of the main flow, there is no affection in the velocity variation of the acoustic particles in the hole 34. In addition, the second term on the right side is negligible because it is a very small amount of second square term. Accordingly, according to Equation (6), it is understood that the force applied to the acoustic particles in the hole 34 is governed by the value of the inner product of the two vectors shown in the third term of the right side. More specifically, the magnitude of the dynamic pressure is governed by the magnitude of the inner product of the velocity vector of the main flow and the velocity vector of the particle of the soundwave in the hole 34.

According to the configuration of the present embodiment, by crossing the flow direction of the main flow and the extension direction of the hole 34 without crossing each other at right angles, the inner product of the velocity vector of the main flow and the velocity vector of the particle of the sound wave in the hole 34 can be made larger than 0. In other words, it is possible to increase the kinetic energy of the sound wave flowing through the hole 34. Thus, a sound wave can be sufficiently taken into the space inside the housing 33. Accordingly, it is possible to sufficiently reduce the noise (acoustic vibration) generated in the combustor 3. Further, by applying such a combustor 3 to the gas turbine 1, it is possible to reduce the possibility of resonance occurring in the gas turbine 1 based on the acoustic vibration.

First Modification of First Embodiment

Figure 6:
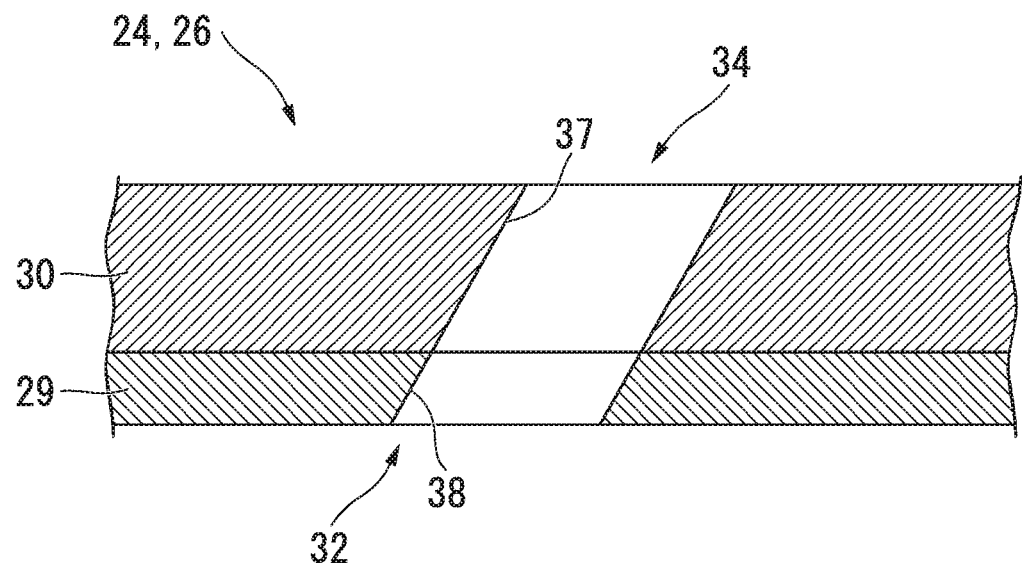
FIG. 6 is an enlarged cross-sectional view of an essential portion showing a first modification of the acoustic device according to a first embodiment of the present invention.

In addition, in the first embodiment, an example has been described in which the hole 34 extends from the upstream side toward the downstream side in the flow direction of the main flow while directed toward the inside from the outside in the radial direction of the perforated region 32. However, as described above, if the velocity vector of the main flow and the extension direction of the hole 34 intersect each other without crossing each other, the value of the inner product of these two vectors becomes larger than 0, and therefore, the extension direction of the hole 34 is not limited in accordance with the first embodiment. As another example, as shown in FIG. 6, the hole 34 may extend from the upstream side to the downstream side in the flow direction of the main flow while directed from the inside to the outside in the radial direction of the perforated region 32.

Second Modification of First Embodiment

Figure 7:
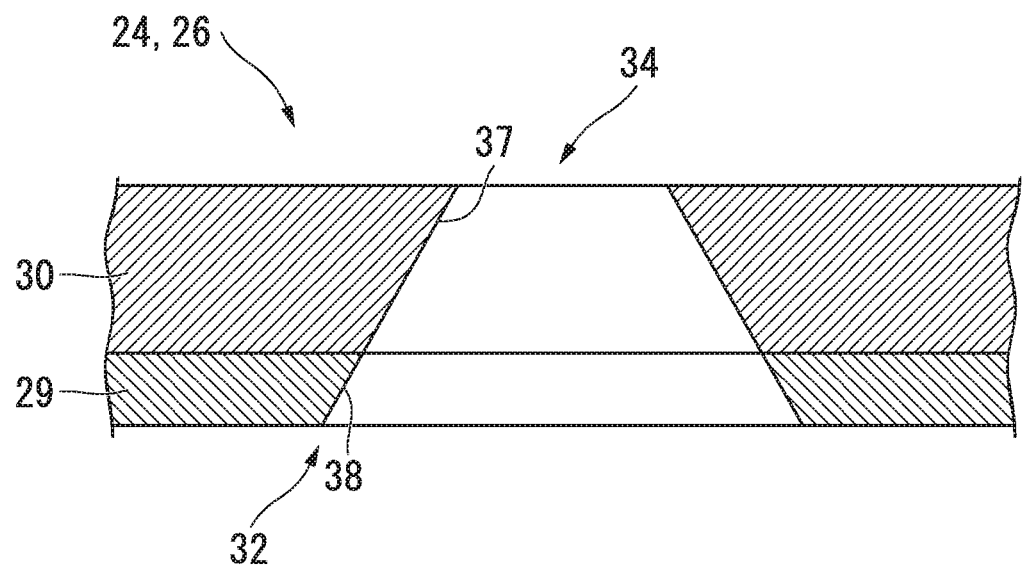
FIG. 7 is an enlarged cross-sectional view of an essential portion showing a second modification of the acoustic device according to the first embodiment of the present invention.

Further, as shown in FIG. 7, the hole 34 may be formed in a funnel shape by gradually increasing in diameter from the radially outer side toward the inner side. Also with this configuration, it is possible to incline the velocity vector of the acoustic particles in the hole 34 without making the velocity vector orthogonal to the velocity vector of the main flow. Also with these configurations, it is possible to obtain an effect similar to that of the first embodiment.

Second Embodiment

Figure 8:
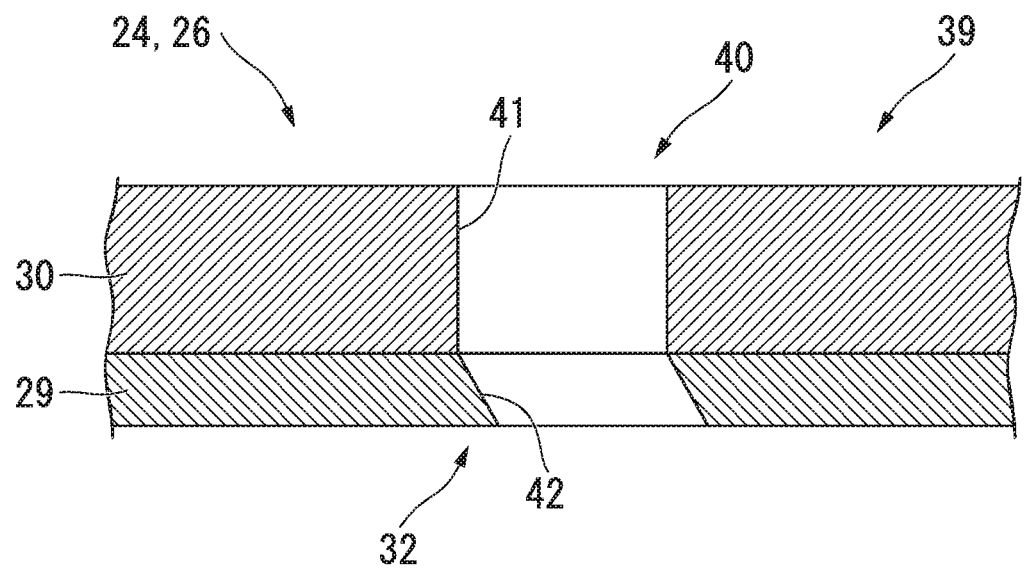
FIG. 8 is an enlarged cross-sectional view of an essential portion of an acoustic device according to a second embodiment of the present invention.

Next, a second embodiment of the present invention will be described with reference to FIG. 8. In an acoustic device 39 according to the present embodiment, only the shape of the hole 40 is different from that of the acoustic device 4 according to the first embodiment. More specifically, the hole 40 is formed by an outer hole portion 41 formed in the outer plate 30 and an inner hole portion 42 formed in the inner plate 29. The outer hole 41 extends radially with respect to the combustor axis Ac. On the other hand, the inner hole 42 is inclined with respect to the radial direction. More specifically, the inner hole 42 extends from one side (upstream side) toward the other side (downstream side) of the main flow direction while directed from the outer side toward the inner side in the radial direction. In addition, the opening size of the inner hole 42 and the opening size of the outer hole 41 are equal to each other.

In this configuration, the perforated plate is formed by the outer plate 30 and the inner plate 29, and only the inner hole 42 formed in the inner plate 29 is inclined. Thus, it is possible to sufficiently take in a soundwave (acoustic particles) toward the space inside the housing 33 based on the same action as in the first embodiment described above.

In addition, since only the inner hole portion 42 is inclined, it is possible to reduce the degree of difficulty and cost required for manufacturing the perforated plate as compared with a case where the inner hole portion 42 and the outer hole portion 41 are inclined together. On the other hand, when both of the inner hole 42 and the outer hole 41 are inclined, the inner plate 29 and the outer plate 30 must be provided with an opening that extends obliquely. Forming an opening that extends obliquely in a plate member generally leads to a higher cost. However, in the present embodiment, only one of the plate members (inner plate 29) is formed with an inclined opening, so that it is possible to avoid such a high cost as described above.

First Modification of Second Embodiment

In the second embodiment described above, an example has been described in which the opening size of the inner hole portion 42 and the opening size of the outer hole portion 41 are set equal to each other. In this respect, the configuration according to the second embodiment is still required to have high machining accuracy. However, requiring such high machining accuracy may hinder the mass production of the device. Therefore, as shown in FIG. 9 and FIG. 10, for example, it is also possible to adopt a configuration in which the opening size of the inner hole portion 42 and the opening size of the outer hole portion 41 are different from each other.

Figure 9:
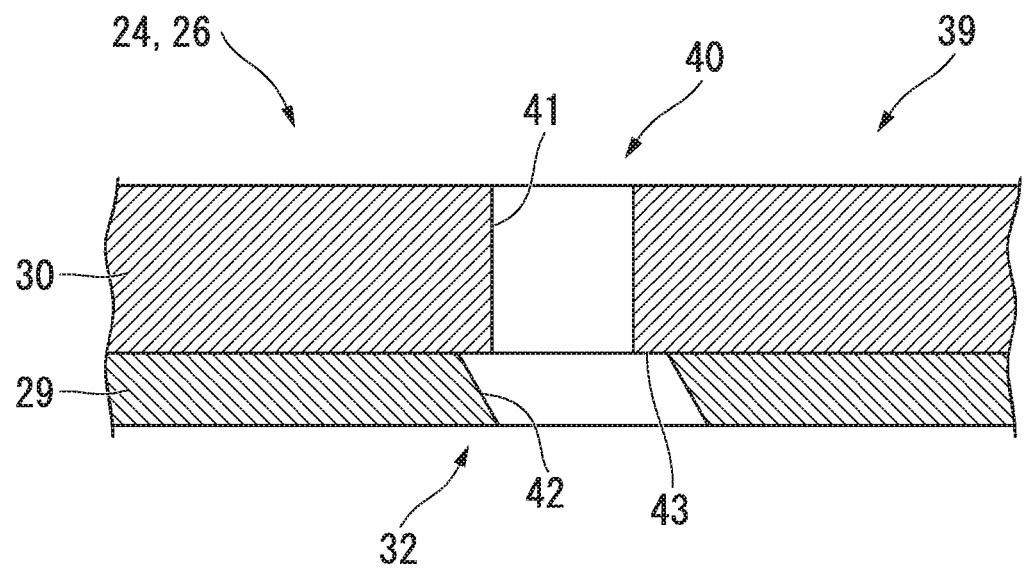
FIG. 9 is an enlarged cross-sectional view of an essential portion showing a first modification of the acoustic device according to the second embodiment of the present invention.
Figure 10:
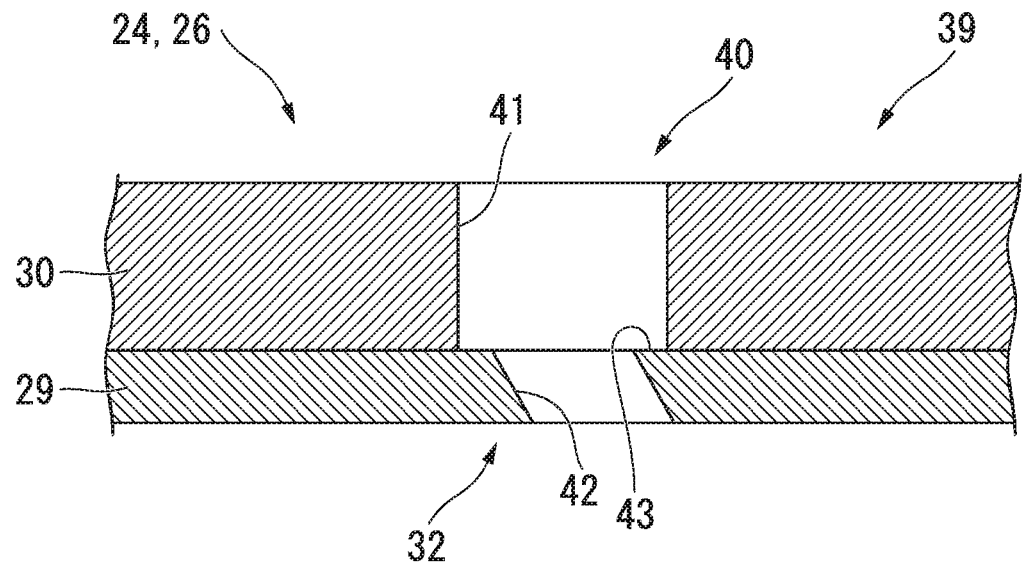
FIG. 10 is an enlarged cross-sectional view of an essential portion showing a second modification of the acoustic device according to the second embodiment of the present invention.

In the example shown in FIG. 9, more specifically, the opening size of the inner hole portion 42 is set to be slightly larger than the opening size of the outer hole portion 41. In other words, when viewed from the inner side of the hole 40 in the radial direction (main flow side), a partial region including an outer peripheral edge of the outer hole portion 41 is exposed in the hole 40. In other words, a step portion 43 is formed inside the hole 40 by this outer peripheral edge.

Since such a step portion 43 serves as a resistance to an acoustic particle that has reached the inside of the hole 40, it is possible to sufficiently attenuate the sound wave captured by the hole 40. Further, since it is not necessary to make the opening size of the inner hole 42 and the opening size of the outer hole 41 coincide with each other, it is possible to manufacture the perforated plate more easily and at a lower cost.

Second Modification of Second Embodiment

Further, as shown in FIG. 10, it is also possible to set the opening size of the inner hole portion 42 to be slightly smaller than the opening size of the outer hole portion 41. According to this configuration, the step portion 43 is formed in the hole 40 by the outer peripheral edge of the outer hole portion 41. Since this step portion 43 becomes a resistance to the acoustic particles that have reached the inside of the hole 40, it is possible to further sufficiently attenuate the sound wave. Further, since it is not necessary to make the opening size of the inner hole 42 and the opening size of the outer hole 41 coincide with each other, it is possible to manufacture the perforated plate more easily and at a lower cost.

Third Modification of Second Embodiment

Figure 11:
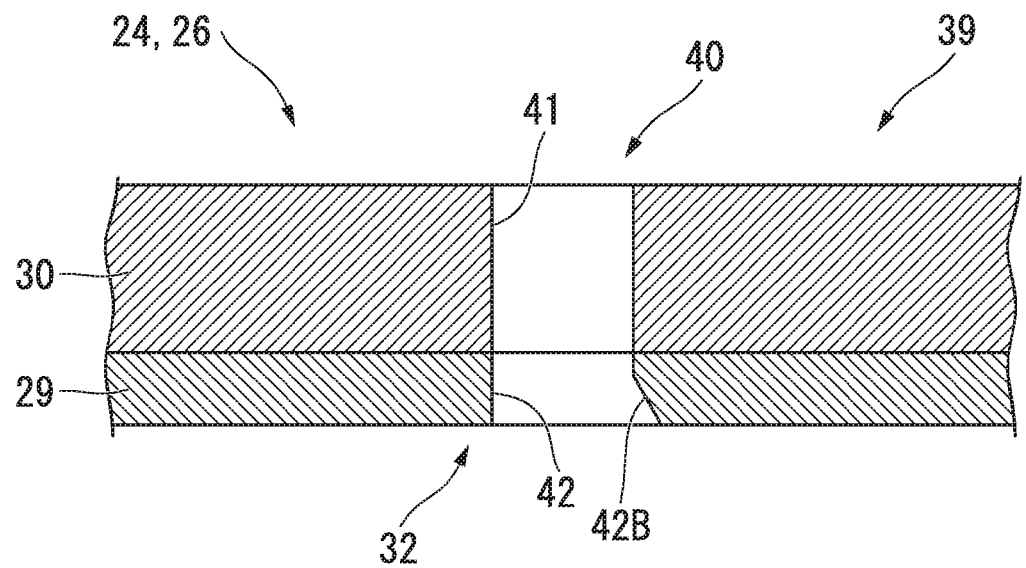
FIG. 11 is an enlarged cross-sectional view of an essential portion showing a third modification of the acoustic device according to the second embodiment of the present invention.

Further, in a case of further ease of machining, it is also possible to adopt a configuration as shown in FIG. 11. In the configuration shown in FIG. 11, only the downstream-side end surface 42B of the inner hole portion 42 is inclined with respect to the flow direction of the main flow. More specifically, the downstream-side end surface 42B extends gradually from the upstream side toward the downstream side while directed from the outside toward the inside in the radial direction.

In forming such a hole 40, it is practical to first form a hole having a uniform opening size on a perforated region 32 (a perforated plate), and then to enlarge the diameter of the hole towards only the downstream side using a tool such as a reamer or the like. In other words, according to this configuration, as compared with the configuration in which the entire wall of the hole 40 is inclined, the allowable range of accuracy required for machining is wide, so that the hole 40 can be more easily formed.

Third Embodiment

Figure 12:
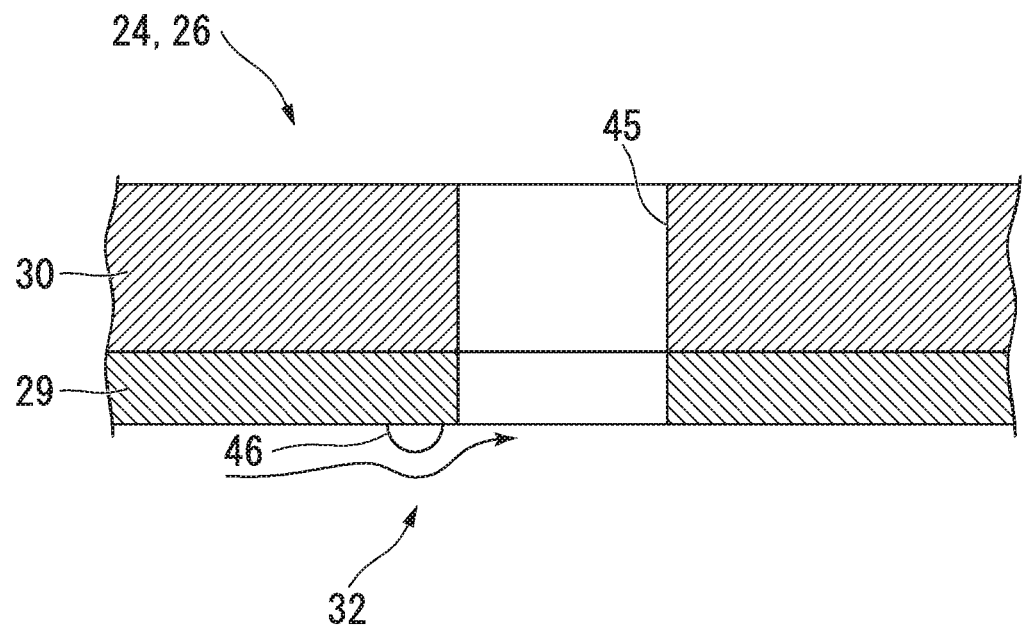
FIG. 12 is an enlarged cross-sectional view of an essential portion of an acoustic device according to a third embodiment of the present invention.

Next, a third embodiment of the present invention will be described with reference to FIG. 12. As shown in FIG. 4, in this embodiment, a hole 45 extends in the radial direction with respect to the combustor axis Ac. In other words, the hole 45 extends in parallel with the thickness direction of the perforated region 32 (perforated plate). Further, a convex portion 46 (convexo-concave shape) is provided in a region inside the hole 45 in the radial direction and on the upstream side of the main flow. The convex portion 46 provides from the inner surface of the perforated plate in the radial direction further toward the inside in the radial direction. Further, the convex portion 46 has a semicircular cross section when viewed from the circumferential direction with respect to the combustor axis Ac.

According to this configuration, as shown by an arrow in the drawing, a disturbance can be caused with respect to the flow of the main flow. More specifically, the main flow flowing from the upstream side collides with the convex portion 46, thereby the main flow locally separated from the surface of the perforated plate. The separated flow component flows again along a surface of the convex portion 46 toward the outside in the radial direction and the downstream side. In other words, a component in a direction toward the hole 45 is added to the main flow that has passed through the convex portion 46.

In other words, according to the above configuration, the direction in which the main flow flows from the upstream side of the hole 45 is changed by the convex portion 46 that is formed on the upstream side of the hole 45. Thus, an extension direction in which the holes 45 extend and the flow direction of the main flow can be crossed without crossing each other at right angles. Thus, as in each of the embodiments described above, acoustic particles can be sufficiently captured toward the space inside the housing 33.

Modification of Third Embodiment

Figure 13:
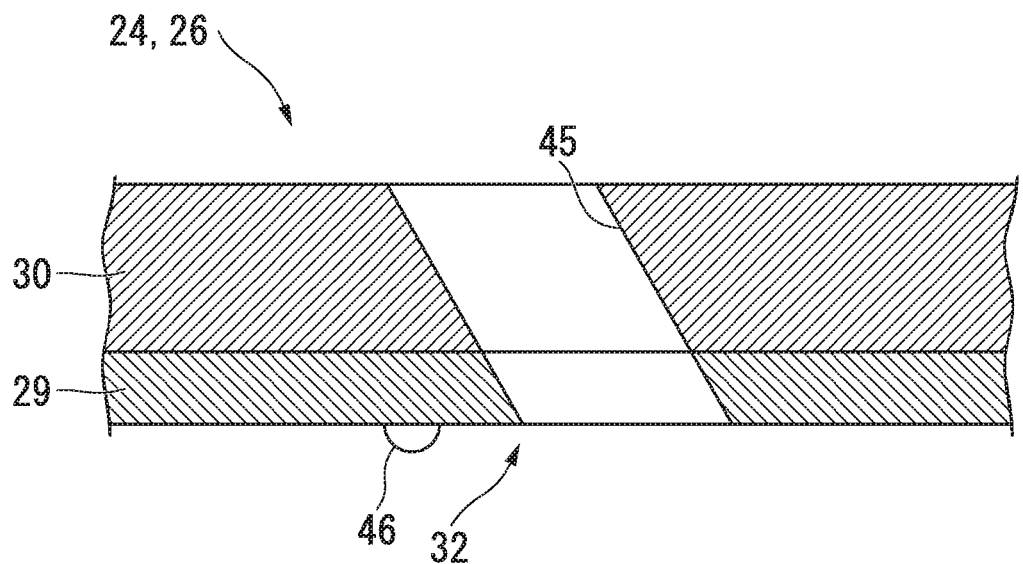
FIG. 13 is an enlarged cross-sectional view of an essential portion showing a modification of the acoustic device according to the third embodiment of the present invention.

In addition, in the third embodiment described above, an example has been described in which the hole 45 extends in the radial direction of the combustor axis Ac. However, the shape of the hole 45 is not limited to the above, and may be inclined with respect to the flow direction of the main flow, as drown in FIG. 13, for example. In other words, it is also possible to provide the convex portion 46 described in the third embodiment in an upstream region of the hole 34 according to the first embodiment.

According to such a configuration, it is possible to sufficiently guide acoustic particles into the hole 45 based on the action described in the first embodiment and the third embodiment. Thus, noise can be further sufficiently reduced.

Fourth Embodiment

Next, a fourth embodiment of the present invention will be described with reference to FIG. 14. As shown in FIG. 4, the hole 47 in the gas of this embodiment extends in a radial direction with respect to the combustor axis Ac. Further, a concave portion 48 (convexo-concave shape) is provided in a region on the upstream side of the main flow on the inner side of the hole 47 in the radial direction. The concave portion 48 is recessed from the inner surface of the perforated plate in the radial direction toward the radially outer side of the perforated plate. In addition, the concave portion 48 has a triangular cross section when viewed from the circumferential direction with respect to the combustor axis Ac.

Figure 14:
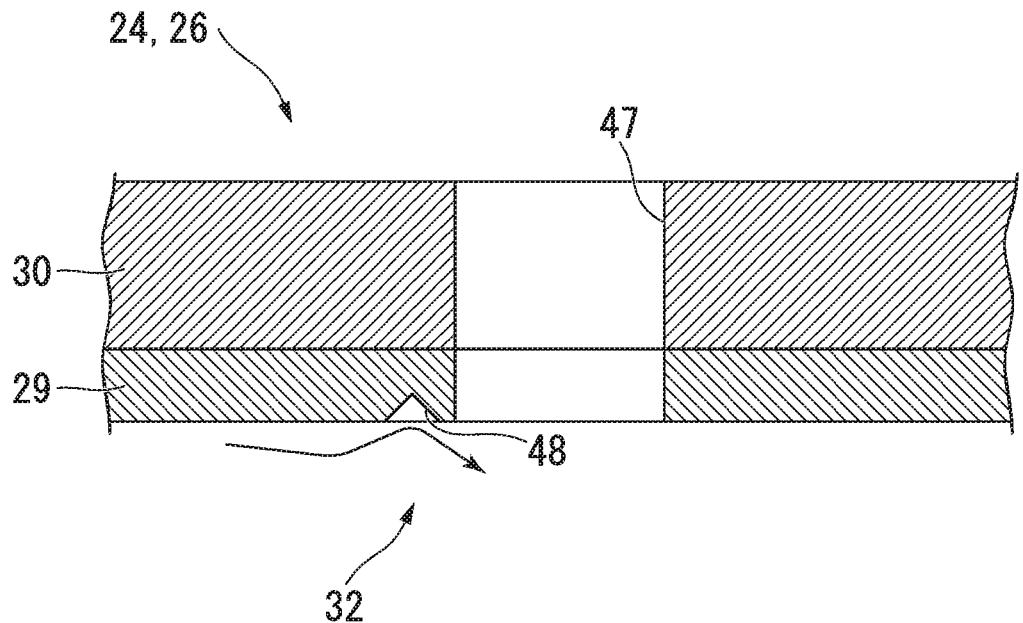
FIG. 14 is an enlarged cross-sectional view of an essential portion of an acoustic device according to a fourth embodiment of the present invention.

According to such a configuration, as in the third embodiment, disturbance can be caused in the flow of the main flow (an arrow in FIG. 14). More specifically, the flow direction of the main flow flowing from the upstream side is changed toward the inside of the concave portion 48. Flow component leaving the concave portion 48 flows radially inward and toward the downstream side. In other words, a component in a direction away from the concave portion 48 is added to the main flow that has passed through the hole 47.

In other words, according to the above configuration, the flow direction of the main flow flowing from the upstream side of the hole 47 is changed by the concave portion 48 formed on the upstream side of the hole 47. Thus, an extension direction in which the hole 47 extends and the flow direction of the main flow flows can be crossed without crossing each other at right angles. Thus, as in each of the embodiments described above, acoustic particles can be sufficiently captured toward the space inside the housing 33.

Modification of Fourth Embodiment

Figure 15:
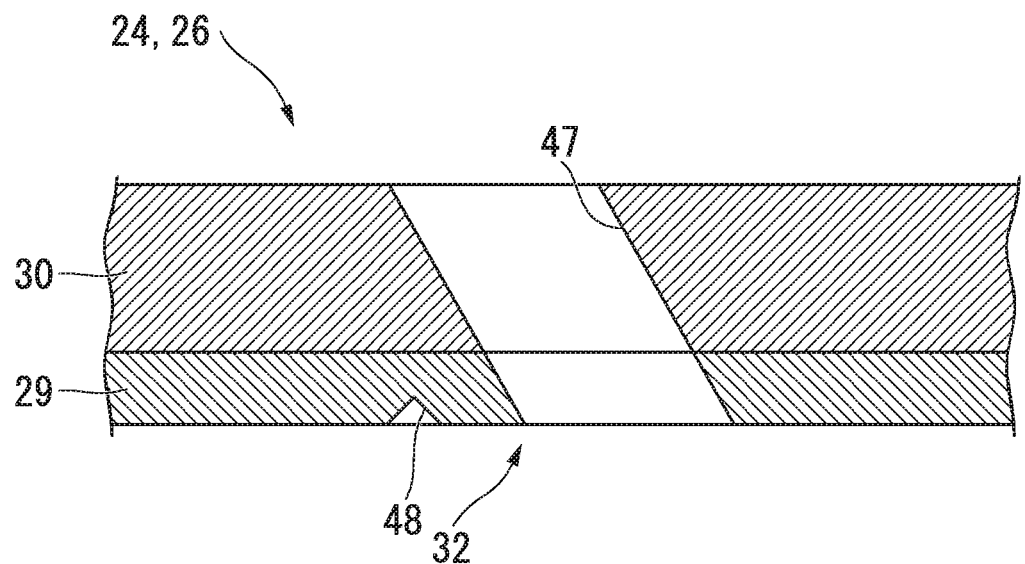
FIG. 15 is an enlarged cross-sectional view of an essential portion showing a modification of the acoustic device according to the fourth embodiment of the present invention.

In addition, in the fourth embodiment described above, an example has been described in which the hole 47 extends in the radial direction of the combustor axis Ac. However, the shape of the hole 47 is not limited to the above, and may be inclined with respect to the flow direction in which the main flow flows, as shown in FIG. 15, for example. In other words, it is also possible to provide the concave portion 48 described in the fourth embodiment in an upstream region of the hole 34 according to the first embodiment.

According to such a configuration, it is possible to sufficiently guide acoustic particles into the hole 47 based on the action described in the first embodiment and the fourth embodiment. Thus, noise can be further sufficiently reduced.

Fifth Embodiment

Next, a fifth embodiment of the present invention will be described with reference to FIG. 16. In each of the above embodiments, an example has been described in which the opening in at least one of the inner plate 29 and the outer plate 30 forming the transition piece 24 is inclined with respect to the flow direction of the main flow. However, the configuration of the hole 34 is not limited to the above, and it is also possible to adopt, for example, a configuration as shown in FIG. 16.

Figure 16:
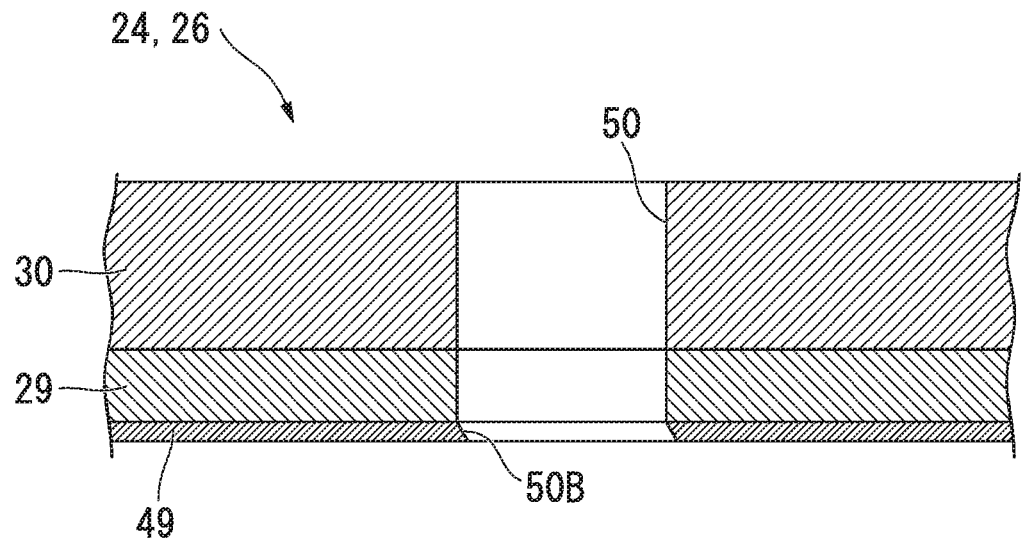
FIG. 16 is an enlarged cross-sectional view of an essential portion of an acoustic device according to a fifth embodiment of the present invention.

In the example shown in FIG. 16, a TBC layer 49 (Thermal Barrier Coating layer), which is not shown in FIGS. 5 to 15, is provided on the inner surface of the inner plate 29 in the radial direction.

The TBC layer 49 is provided for the purpose of protecting the inner peripheral surface of the transition piece 24 (inner plate 29) from radiant heat of combustion gas (main flow) and the like. The TBC layer 49 has a smaller thickness (size in the radial direction) than the inner plate 29. Further, the TBC layer 49 is formed by first applying a gel-like agent and then curing the coated agent. In other words, the TBC layer 49 can be subjected to a cutting machining or the like. Thus, in the example of FIG. 16, the hole 50 is formed so as to penetrate the outer plate 30, the inner plate 29, and the TBC layer 49, and only the opening 50B formed in the TBC layer 49 is inclined with respect to the flow direction of the main flow. Also with such a configuration, it is possible to obtain the same operation and effect as those of the above-described embodiments.

Further, in each of the embodiments described above, an example in which the acoustic device 4 is provided in the combustor 3 of the gas turbine 1 has been described. However, the application of the acoustic device 4 is not limited to the gas turbine 1, and any device may be suitably applied as long as it is a device capable of generating noise accompanying the flowing of fluid. As an application other than the gas turbine 1, a chimney used in a flue gas facility of a factory, an exhaust pipe of an automobile, or the like may be considered. In such a device as well, by vising the acoustic device 4 according to the above-described embodiment, it is possible to sufficiently reduce noise and to suppress generation of resonance caused by an acoustic vibration.

INDUSTRIAL APPLICABILITY

According to the present invention, it is possible to provide an acoustic device and a gas turbine which enhance noise reduction effect.

EXPLANATION OF REFERENCE SIGN

1: Gas turbine
2; Compressor
3: Combustor
4: Acoustic device
5: Turbine
6: Compressor Rotor
7: Compressor Casing
8: Compressor Blade
9: Compressor Blade Stage
10: Compressor Vane
11: Compressor Vane Stage
12: Turbine Rotor
13: Turbine Casing
14: Turbine Blade
15: Turbine Blade Stage
16: Turbine Vane
17: Turbine Vane Stage
18: Gas Turbine Rotor
19: Gas Turbine Casing
20: Generator
21: Outer Cylinder
22: Nozzle 23: Inner Cylinder
24: Transition Piece
25: Inlet Ring
26: Central Ring
27: Outlet Ring
28: Transition Piece Step Portion
29: Inner Plate
30: Outer Plate
31: Recessed Groove
32: Perforated Region
33: Housing
34: Hole
35: Main Plate
36: Lateral Plate
37: Outer Hole Portion
38: Inner Hole Portion
39: Acoustic Device
40: Hole
41: Outer Hole Portion
42: Inner Hole Portion
43: Step Portion
44: Step Portion
45: Hole
46: Convex Portion
47: Hole
48: Concave Portion
49. TBC Layer
50: Hole
Ac: Combustor Axis
As: Axis

The invention claimed is:

1. An acoustic device comprising:
a perforated plate that has a plurality of holes penetrating in a plate thickness direction of the perforated plate and in which a main flow is to flow on a first side of the perforated plate in the plate thickness direction; and
a housing that is on a second side of the perforated plate in the plate thickness direction and partitions a space between the housing and the perforated plate,
wherein:
the main flow is a combustion gas flow;
each of the plurality of holes is inclined from an upstream side toward a downstream side of a flow direction of the main flow while directed from the first side of the perforated plate toward the second side of the perforated plate in the plate thickness directions;
the perforated plate has an inner plate facing toward the first side in the plate thickness direction, the inner plate facing the main flow, and an outer plate stacked on the second side of the inner plate in the plate thickness direction; and
each of the plurality of holes includes:
an inner hole portion that penetrates the inner plate in the plate thickness direction and is inclined from the upstream side toward the downstream side of the flow direction of the main flow; and
an outer hole portion that aligns continuously with the inner hole portion to communicate with the inner hole portion, penetrates the outer plate in the plate thickness direction, and extends in the plate thickness direction.

2. The acoustic device according to claim 1, wherein an opening size of the inner hole portion is larger than an opening size of the outer hole portion.

3. The acoustic device according to claim 1, wherein an opening size of the inner hole portion is smaller than an opening size of the outer hole portion.

4. The acoustic device according to claim 1, wherein a convexo-concave shape is at least one of a convex portion or a concave portion and is formed on the upstream side of each of the plurality of holes on a surface of the perforated plate which is configured to be in contact with the main flow.

5. A gas turbine comprising:
a compressor configured to generate pressurized air;
a combustor configured to generate a combustion gas by mixing a fuel with the pressurized air and burning the fuel and the pressurized air which have been mixed;
the acoustic device according to claim 1; and
a turbine configured to be driven by the combustion gas,
wherein the acoustic device is mounted on the combustor.

6. The acoustic device according to claim 4, wherein the convexo-concave shape is the concave portion, and the concave portion has a triangular cross section.

7. The acoustic device according to claim 4, wherein the convexo-concave shape is the convex portion, and the convex portion has a semicircular cross section.

8. The acoustic device according to claim 1, wherein a Thermal Barrier Coating layer is on an inner surface of the inner plate which is a surface on the first side of the perforated plate in the plate thickness direction.

* * * * *